United States Patent
Napier

(10) Patent No.: US 9,194,293 B2
(45) Date of Patent: Nov. 24, 2015

(54) AIR INLET NOISE ATTENUATION ASSEMBLY

(75) Inventor: James C. Napier, San Diego, CA (US)

(73) Assignee: Hamilton Sundstrand Corporation, Rockford, IL (US)

( * ) Notice: Subject to any disclaimer, the term of this patent is extended or adjusted under 35 U.S.C. 154(b) by 2208 days.

(21) Appl. No.: 11/901,591

(22) Filed: Sep. 18, 2007

(65) Prior Publication Data

US 2009/0074564 A1   Mar. 19, 2009

(51) Int. Cl.
*F02C 7/045*   (2006.01)

(52) U.S. Cl.
CPC .............. *F02C 7/045* (2013.01); *F05D 2260/96* (2013.01); *F05D 2260/963* (2013.01)

(58) Field of Classification Search
CPC ........ F02C 7/32; F02C 7/045; F05D 2220/50; B64D 2041/002
USPC ..................... 415/119, 182.1, 203, 206, 208.1
See application file for complete search history.

(56) References Cited

U.S. PATENT DOCUMENTS

| | | |
|---|---|---|
| 3,011,584 A | 12/1961 | Lemmerman et al. |
| 3,620,329 A | 11/1971 | Wenzlaff |
| 3,715,009 A | 2/1973 | Smith et al. |
| 3,739,872 A | 6/1973 | McNair |
| 3,821,999 A * | 7/1974 | Guess et al. ................... 181/296 |
| 3,913,702 A * | 10/1975 | Wirt et al. ...................... 181/286 |
| 4,371,053 A * | 2/1983 | Jones ............................. 181/249 |
| 4,421,455 A | 12/1983 | Tomren |
| 4,436,481 A | 3/1984 | Linder |
| 4,531,356 A | 7/1985 | Linder |
| 4,645,032 A | 2/1987 | Ross et al. |
| 4,671,381 A * | 6/1987 | Rascov ......................... 181/255 |
| 4,690,245 A * | 9/1987 | Gregorich et al. ............ 181/272 |
| 4,704,143 A * | 11/1987 | Percy ............................... 96/421 |
| 4,834,214 A * | 5/1989 | Feuling ......................... 181/249 |
| 4,927,342 A | 5/1990 | Kim et al. |
| 5,097,656 A | 3/1992 | Napier |
| 5,140,819 A | 8/1992 | Napier et al. |
| 5,162,620 A | 11/1992 | Ross et al. |
| 5,265,408 A | 11/1993 | Sheoran et al. |
| 5,373,691 A | 12/1994 | Gardner et al. |
| 5,491,308 A | 2/1996 | Napier et al. |
| 5,655,359 A | 8/1997 | Campbell et al. |
| 5,687,563 A | 11/1997 | Thompson, Jr. |
| 5,706,651 A | 1/1998 | Lillibridge et al. |
| 5,782,082 A * | 7/1998 | Hogeboom et al. ......... 60/226.1 |
| 5,902,970 A * | 5/1999 | Ferri .............................. 181/249 |
| 5,943,856 A | 8/1999 | Lillibridge et al. |
| 6,092,360 A * | 7/2000 | Hoag et al. ...................... 60/783 |
| 6,094,907 A | 8/2000 | Blackner |
| 6,349,899 B1 * | 2/2002 | Ralston ....................... 244/53 B |
| 6,360,844 B2 * | 3/2002 | Hogeboom et al. .......... 181/213 |
| 6,415,595 B1 | 7/2002 | Wilmot, Jr. et al. |
| 6,439,540 B1 | 8/2002 | Tse |
| 6,520,738 B2 * | 2/2003 | Sheoran et al. ............... 415/205 |
| 6,695,094 B2 | 2/2004 | Moffat et al. |
| 6,704,625 B2 | 3/2004 | Albero et al. |
| 6,868,940 B1 * | 3/2005 | Mekwinski ................... 181/290 |
| 6,942,181 B2 | 9/2005 | Dionne |

(Continued)

*Primary Examiner* — Sean J Younger
(74) *Attorney, Agent, or Firm* — Kinney & Lange, P.A.

(57) ABSTRACT

An air inlet assembly comprising an entrance region configured to receive an airflow, an exit region configured to output the airflow, and an attenuation region disposed between the entrance region and the exit region. The attenuation region has a cross section aspect ratio of at least about 5-to-1, and comprises acoustic absorbing material.

21 Claims, 4 Drawing Sheets

(56) References Cited

U.S. PATENT DOCUMENTS

| | | |
|---|---|---|
| 6,957,569 B1 | 10/2005 | Napier et al. |
| 7,093,447 B2 | 8/2006 | Thompson et al. |
| 7,104,072 B2 | 9/2006 | Thompson |
| 7,124,856 B2 | 10/2006 | Kempton et al. |
| 7,150,431 B2 * | 12/2006 | Dennis ............... 244/53 R |
| 7,344,107 B2 * | 3/2008 | Campbell et al. ......... 244/58 |
| 7,588,212 B2 * | 9/2009 | Moe et al. ............ 244/134 D |
| 2002/0139120 A1 | 10/2002 | Sheoran et al. |
| 2003/0098200 A1 * | 5/2003 | Clark ..................... 181/292 |
| 2005/0268593 A1 | 12/2005 | Hagshenas |
| 2006/0102776 A1 * | 5/2006 | Hein et al. ................ 244/10 |
| 2006/0102781 A1 * | 5/2006 | Hein et al. ................ 244/58 |
| 2006/0179846 A1 * | 8/2006 | Manrique et al. ......... 60/785 |
| 2007/0068169 A1 * | 3/2007 | Riley ......................... 60/778 |

* cited by examiner

AIR INLET NOISE ATTENUATION ASSEMBLY

BACKGROUND

The present invention relates to noise attenuation systems. In particular, the present invention relates to noise attenuation systems for use with gas turbine engines such as aircraft auxiliary power unit (APU) turbine engines.

Large commercial aircraft typically include on-board APU turbine engines, located in the tail sections of the aircraft, to provide electrical power and/or compressed air for systems throughout the aircraft. When an aircraft is on the ground, the primary propulsion engines of the aircraft are shut down, and the APU turbine engine provides the main source of power for a variety of systems, such as the environmental control systems, hydraulic pumps, electrical systems, and main engine starters. The APU turbine engine may also provide power during in-flight operations, such as for electrical and pneumatic systems.

In many gas turbine engine applications, particularly those in which the engine is used in conjunction with a commercial passenger aircraft, there is a widespread demand by the airline industry to maintain noise levels below defined limits. This is particularly important at ground service stations for the aircraft, where ground crew load and unload luggage, fuel and provision the aircraft, and remove waste materials from the aircraft. Under these conditions, the aircraft APU is the turbine engine of interest.

Noise generated during the operation of an APU turbine engine typically includes low frequency noise generated during the combustion process within the turbine engine, and high frequency noise generated by the interaction with inlet air at the compressor portion of the turbine engine. The low frequency noise is typically attenuated with an exhaust silencer placed downstream from the APU exhaust diffuser. This allows the exhaust silencer to attenuate the noise of the combustion gases as the gases exit the exhaust diffusers.

The high frequency noise, however, is typically attenuated with the use of an inlet noise silencer disposed in an air inlet duct, where the air inlet duct is located upstream relative to the APU turbine engine. To provide effective attenuation of high frequency noise, the inlet noise silencer desirably has a narrow passage width that is comparable in size with the wavelengths of the high frequency noise. If the passageway is too large (e.g., greater than about twice the average noise wavelength), the level of noise attenuation decreases.

One common technique to provide small passageways in an air inlet duct involves segregating the duct into separate parallel passages with the use of acoustically lined splitters. Unfortunately, the splitters can collect ice on their leading edges, which may clog the air inlet duct, thereby hindering certification of the APU turbine engine for operation in icing conditions. Furthermore, the use of splitters increases the cost of the inlet noise silencer. As such, there is a need for an inlet noise attenuation system that is effective for attenuating high frequency noise without the use of splitters or other components that may otherwise hinder the use of the APU turbine engine.

SUMMARY

The present invention relates to an air inlet assembly that includes an entrance region configured to receive an airflow from an intake opening of an aircraft, an exit region configured to output the airflow to a turbine engine, and an attenuation region disposed between the entrance region and the exit region. The attenuation region has a cross section aspect ratio of at least about 5-to-1, and includes acoustic absorbing material.

DETAILED DESCRIPTION

Figure 1:
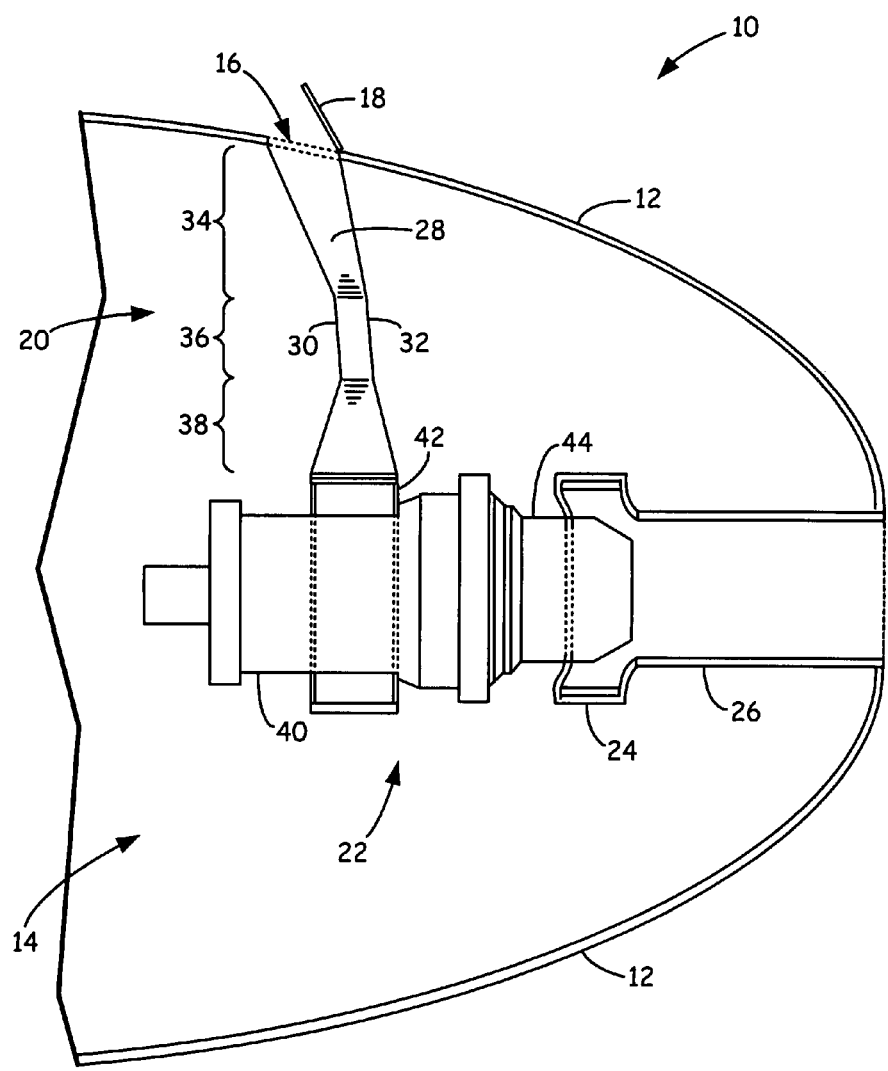
FIG. 1 is a top schematic view of an aircraft tail section, which includes an air inlet assembly in use with an on-board APU turbine engine.

FIG. 1 is a top schematic view of aircraft tail section 10, which includes exterior structure 12 and APU nacelle 14. Exterior structure 12 is an exterior skin of the aircraft, which includes intake opening 16 and door 18. Intake opening 16 extends through exterior structure 12 along the side of aircraft tail section 10 for receiving air. Door 18 is a standard compartment door pivotally connected to exterior structure 12 at intake opening 16, and desirably remains open during the course of operation. APU nacelle 14 is a compartment within exterior structure 12 that contains air inlet assembly 20, APU 22, eductor 24, and exhaust pipe 26.

Air inlet assembly 20 functions as an air inlet duct that extends between intake opening 16 and APU 22 for directing airflow into APU 22. As shown, air inlet assembly 20 includes top wall 28, front wall 30, and rear wall 32, which are exterior walls that divide air inlet assembly 20 into entrance region 34, attenuation region 36, and exit region 38. Entrance region 34 is the upstream portion of air inlet assembly 20 and is disposed adjacent intake opening 16. Attenuation region 36 is the middle portion of air inlet assembly 20 and is disposed downstream of entrance region 34. Exit region 38 is accordingly disposed downstream of attenuation region 36, adjacent APU 22. The terms "upstream" and "downstream" are used herein with reference to the direction of airflow through air inlet assembly 20 from intake opening 16 to APU 22. Air inlet assembly 20 also includes a bottom exterior wall (not shown in FIG. 1) that is an opposing exterior wall to top wall 28.

APU 22 is an on-board gas turbine engine that includes a core engine portion 40 (e.g. including a compressor, combustor and turbine), intake plenum 42, and exhaust diffuser 44, and which provides electrical and/or pneumatic power to the aircraft. Intake plenum 42 connects exit region 38 of air inlet assembly 20 to turbine portion 40, thereby allowing a flow of air to reach core engine portion 40. APU 22 can also include additional components (not shown) that facilitate the operation of APU 22 and the transfer of electrical and/or pneumatic power (e.g., inlet air ducts, gearboxes, generators, and bleed air ducts). While shown in aircraft tail section 10, air inlet assembly 20 and APU 22 may alternatively be located in any suitable location on an aircraft.

Eductor 24 is an airflow system that extends annularly around at least a portion of exhaust diffuser 44 and draws cooling air through APU nacelle 14 and/or an oil cooler (not shown). In alternative embodiments, eductor 24 may be omitted and/or replaced with other cooling airflow systems. Exhaust pipe 26 extends from eductor 24, and provides a channel for expelling gases from aircraft tail section 10. During the course of operation, air flows through air inlet assembly 20 to intake plenum 42 and core engine portion 40 of APU 22. Core engine portion 40 compresses the received air, adds fuel, and combusts the resulting fuel/air mixture. The resulting hot, high-pressure combustion gas then expands through a turbine stage (not shown) within turbine portion 40. The resulting rotation of the turbines is used to generate electrical power for associated devices of the aircraft (not shown). The spent combustion gases exit through exhaust diffuser 44, and are expelled from aircraft tail section 10 through exhaust pipe 26. APU nacelle 14 may also include an exhaust silencer (not shown) located downstream from eductor 24 for attenuating low frequency noise.

While operating, core engine portion 40 generates high frequency noise (e.g., greater than about 4,000 Hertz, with a peak frequency of about 11,000 Hertz) due to the inducer blade passing frequency of the compressor. However, as discussed below, top wall 34, front wall 36, rear wall 38, and the bottom exterior wall of air inlet assembly 20 provide a narrow passage width at attenuation region 36 that is comparable in size with the wavelengths of the high frequency noise. This allows attenuation region 36 to reduce the high frequency noise passing upstream from APU 22. Additionally, attenuation region 36 has a cross section with a high aspect ratio, thereby substantially preserving the volumetric flow rate of air through air inlet assembly 20 without the use of segregating splitters that are typical with conventional inlet noise silencers. Accordingly, air inlet assembly 20 has a reduced risk of ice build up, thereby allowing air inlet assembly 20 to be used in icing conditions while providing compliance with aviation noise standards.

Figure 2:
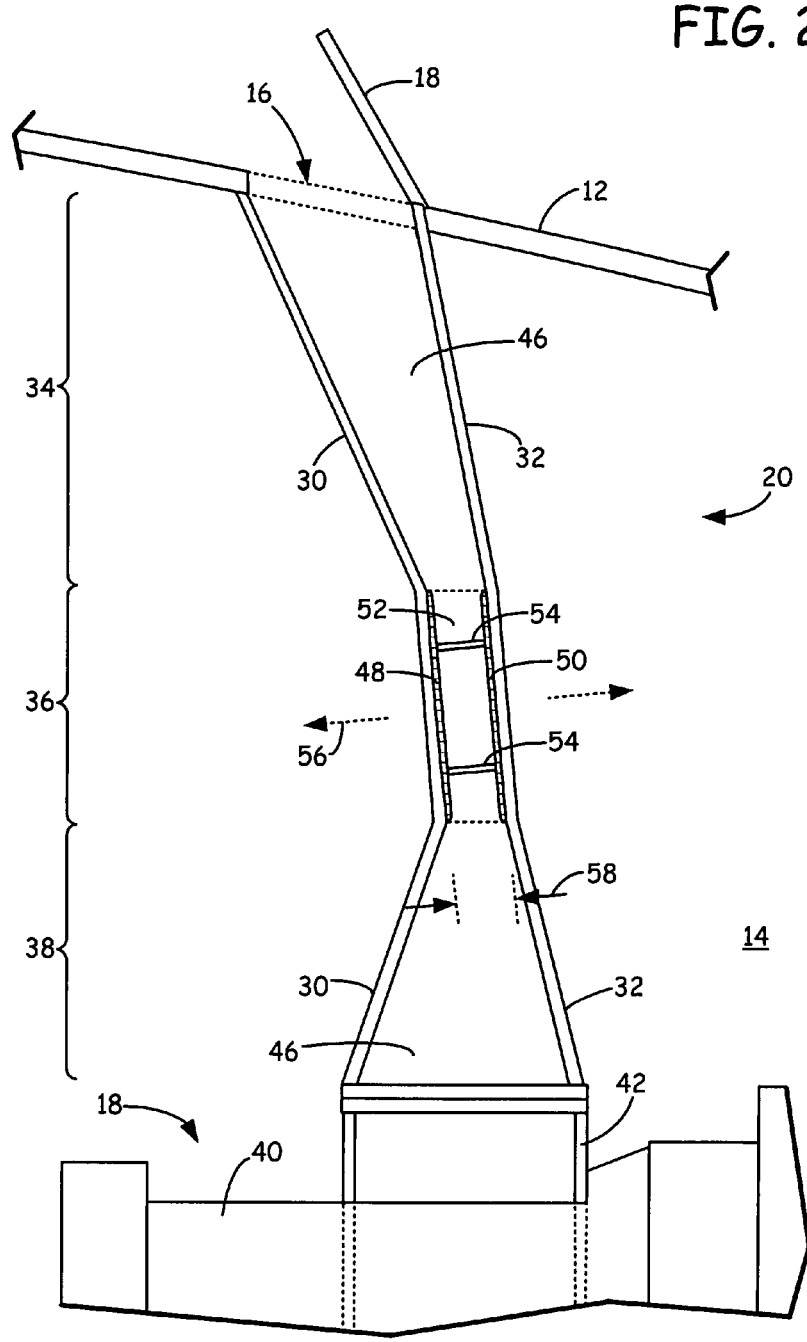
FIG. 2 is an expanded top schematic view of the air inlet assembly in the aircraft tail section, illustrating the interior of the air inlet assembly.

FIG. 2 is an expanded top schematic view of air inlet assembly 20 in aircraft tail section 10, illustrating the interior of air inlet assembly 20. As shown, air inlet assembly 20 further includes bottom wall 46, liners 48, 50, and 52, and supports 54, where bottom wall 46 is the bottom exterior wall that opposes top wall 28 (shown in FIG. 1). Liners 48, 50, and 52 are acoustic liners respectively secured to, or integrated with, front wall 30, rear wall 32, and bottom wall 46 at attenuation region 36, and are configured to attenuate noise that travels upstream through attenuation region 36 from APU 22. An additional acoustic liner (not shown in FIG. 2) is also desirably secured to the interior surface of top wall 28 (shown in FIG. 1) at attenuation region 36. Examples of suitable liners for liners 48, 50, 52, and the additional liner secured to top wall 28 include layers capable of dissipating acoustic energy, such as porous sheets, honeycomb matrices, acoustic-absorbent layers, and combinations thereof. In one embodiment, liners 48, 50, 52, and the additional liner each include a multi-layer structure containing a honeycomb core disposed between a backing layer (e.g., an aluminum backing sheet) and an outer plate formed from a porous acoustic media.

Supports 54 could be rigid pins secured between front wall 30 and rear wall 32 that provide reinforcing support for attenuation region 36. Supports 54 are also desirably layered with acoustic liners to further dissipate acoustic energy traveling upstream through attenuation region 36. Examples of suitable liners for supports 54 include those discussed above for liners 48, 50, and 52. Each support 54 desirably has a small surface area, thereby reducing the risk of ice build up within attenuation region 36.

As shown at entrance region 34, front wall 30 and rear wall 32 are secured to exterior structure 12 at intake opening 16, and converge along entrance region 34 toward attenuation region 36. Similarly, at exit region 38, front wall 30 and rear wall 32 are secured to intake plenum 42 of APU 18, and converge along exit region 38 toward attenuation region 36.

At attenuation region 36, front wall 30 and rear wall 32 have interior surfaces offset along lateral axis 56, where lateral axis 56 is perpendicular to the airflow direction through attenuation region 36. The interior surfaces of front wall 30 and rear wall 32 are offset by an average width along lateral axis 56 (referred to as offset width 58). Offset width 58 provides a narrow gap between front wall 30 and rear wall 32, thereby positioning liners 48 and 50 at positions to attenuate the high frequency noise traveling upstream through attenuation region 36.

As discussed above, high frequency noise waves generated from APU 18 have small wavelengths (e.g., from about 4,500 Hertz to about 20,000 Hertz). These small wavelengths may be attenuated with the use of acoustically-lined passageways having small passage widths that are comparable in size to the wavelengths. Accordingly, examples of suitable average distances for offset width 58 range from about 15 millimeters to about 150 millimeters, with particularly suitable average distances for offset width 58 ranging from about 20 millimeters to about 100 millimeters, and with particularly suitable average distances for offset width 58 ranging from about 25 millimeters to about 50 millimeters. In one embodiment, front wall 30 and rear wall 32 are substantially parallel at attenuation region 36. In alternative embodiments, one or more of top wall 28, front wall 30, rear wall 32, and bottom wall 46 have non-planar portions, and may intersect each other with rounded corners. In these embodiments, front wall 30 and rear wall 32 each desirably have planar portions at attenuation region 36 to which liners 48 and 50 are secured for attenuating noise. Accordingly, the average distance of offset height 58 is measured from these planar portions of front wall 30 and rear wall 32.

Because of the narrow gap between front wall 30 and rear wall 32 (i.e., offset width 58), attenuation region 36 is free of segregating splitters that are typical with conventional inlet noise silencers. As discussed above, this reduces the risk of ice build up within attenuation region 36. As such, air inlet assembly 20 is suitable for use in icing conditions while providing compliance with aviation noise standards.

Figure 3:
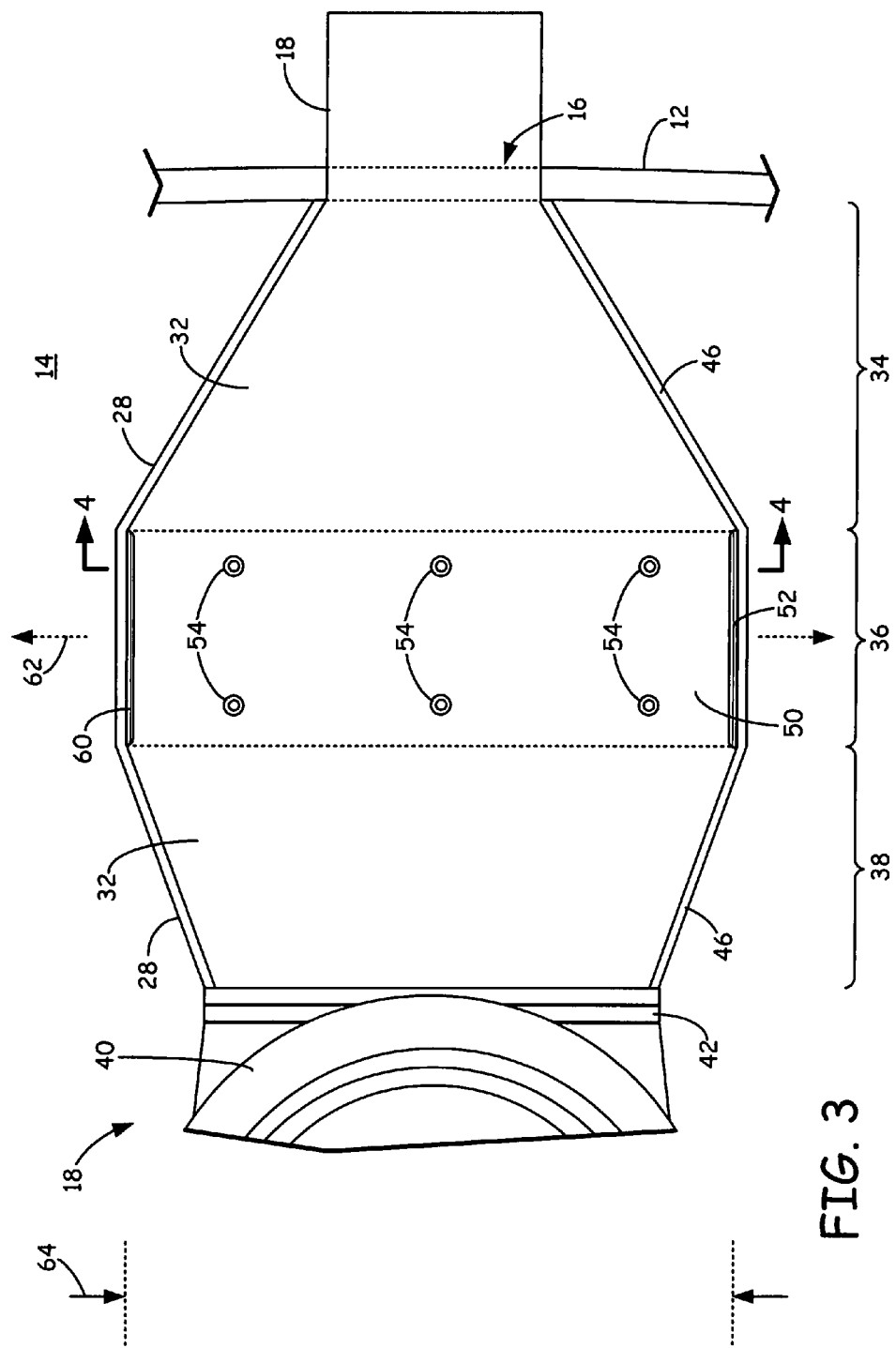
FIG. 3 is an expanded front schematic view of the air inlet assembly the aircraft tail section, further illustrating the interior of the air inlet assembly.

FIG. 3 is an expanded front schematic view of air inlet assembly 20 in aircraft tail section 10, further illustrating the interior of air inlet assembly 20. As shown, air inlet assembly 20 further includes liner 60, which is the additional acoustic liner secured to top wall 28 at attenuation region 36. As discussed above, the narrow gap between front wall 30 (shown in FIG. 2) and rear wall 32 positions liner 48 (shown in FIG. 2) and liner 50 to attenuate high frequency noise traveling upstream through attenuation region 36. Liners 52 and 60 increase the acoustically-lined surface area of attenuation region 36, thereby further dissipating acoustic energy traveling upstream through attenuation region 36.

Attenuation region 36 is also shown in use with six support pins 54, which is a suitable number of support pins 54 for reinforcing attenuation region 36 while also allowing support pins 54 to have small surface areas. In alternative embodiments, fewer or greater numbers of support pins 54 may be used. Examples of suitable numbers of support pins 54 for reinforcing attenuation region 36 range from one to about ten pins, with particularly suitable numbers of support pins 54 ranging from about four to about eight pins. In additional embodiments, attenuation region 36 may be reinforced with alternative structural supports, such as strengthened walls (e.g., top wall 28 and bottom wall 46). In these additional embodiments, support pins 54 may be omitted.

As shown at entrance region 34, top wall 28 and bottom wall 46 are secured to exterior structure 12 at intake opening 16, and diverge along entrance region 34 toward attenuation region 36. Similarly, at exit region 38, top wall 28 and bottom wall 46 are secured to intake plenum 42 of APU 18, and diverge along exit region 38 toward attenuation region 36. In contrast to the narrow gap between front wall 30 (shown in FIG. 2) and rear wall 32, at attenuation region 36, top wall 28 and bottom wall 46 have interior surfaces that are offset along vertical axis 62 by an average height (referred to as offset height 64), where vertical axis 62 is perpendicular to the direction of air flow through attenuation region 36 and to lateral axis 56 (shown in FIG. 2). Offset height 64 desirably provides a wide gap between top wall 28 and bottom wall 46, which preserves the volumetric flow rate of air through air inlet assembly 20 despite the narrow gap between front wall 30 and rear wall 32.

Figure 4:
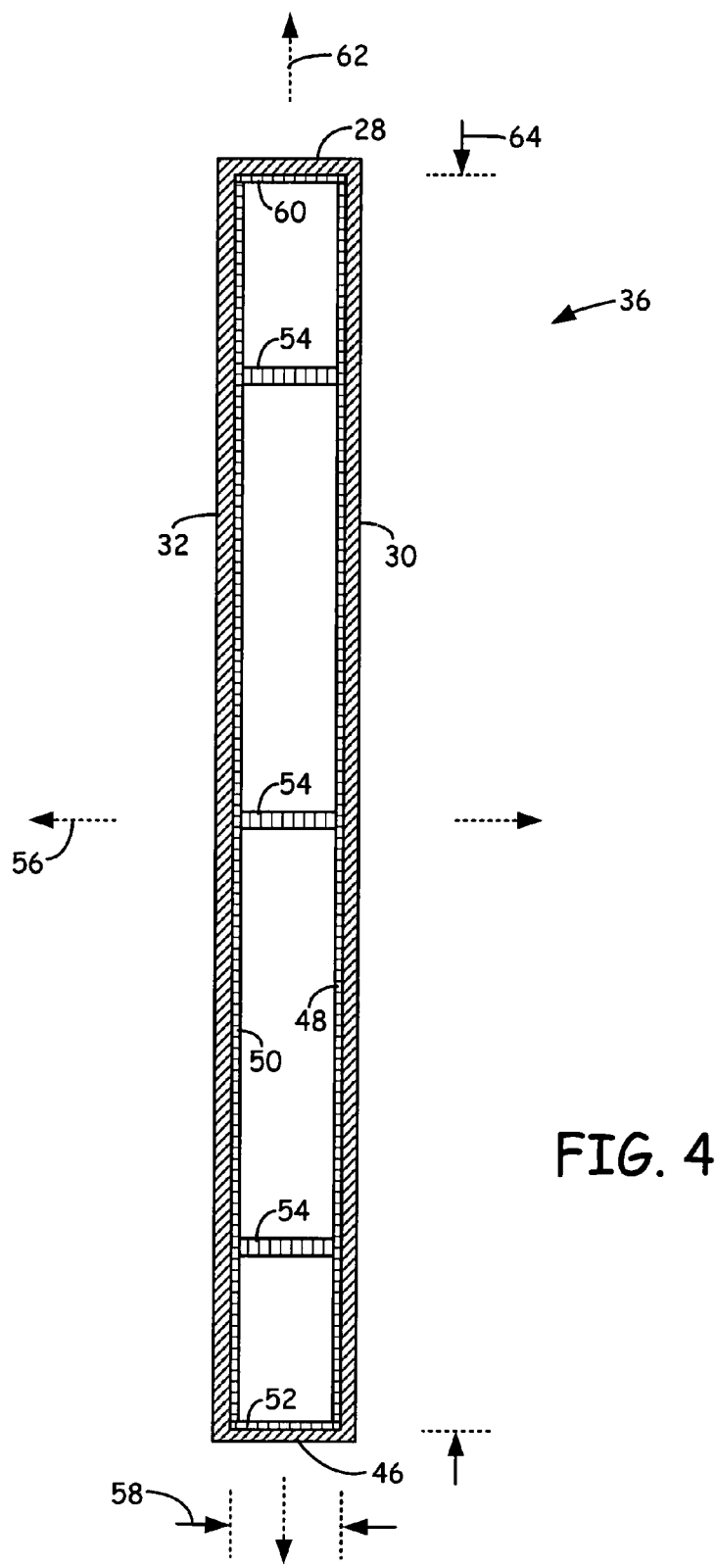
FIG. 4 is a sectional view of section 4-4 taken in FIG. 3, illustrating an attenuation region of the air inlet assembly.

FIG. 4 is a sectional view of section 4-4 taken in FIG. 3, which illustrates a cross section of attenuation region 36 substantially perpendicular to the direction of airflow. As shown, the narrow gap between front wall 30 and rear wall 32 along lateral axis 56 (i.e., offset width 58) and the wide gap between top wall 28 and bottom wall 46 along vertical axis 62 (i.e., offset height 64) provide attenuation region 36 with a high aspect ratio cross section. As discussed above, the high aspect ratio cross section is obtained by the convergence of front wall 30 and rear wall 32 as they progress toward attenuation region 36 combined with the divergence of top wall 28 and bottom wall 46 as they progress toward attenuation region 36. Accordingly, the high aspect ratio cross section allows attenuation region 36 to have a narrow passage width for attenuating noise traveling upstream from APU 18 (shown in FIG. 1) without the use of segregating splitters, while also preserving the volumetric flow rate of air through air inlet assembly 20.

In the embodiment shown in FIG. 4, the aspect ratio of the cross section of attenuation region 36 is measured as a ratio of offset height 64 relative to offset width 58. Examples of suitable aspect ratios for the cross section of attenuation region 36 include ratios of at least about 5-to-1, with particularly suitable aspect ratios including ratios of at least about 7-to-1, and with even more particularly suitable aspect ratios including ratios of at least about 10-to-1. The aspect ratio of the cross section of attenuation region 36 is also desirably low enough such that offset height 64 (i.e., the distance between top wall 28 and bottom wall 46) fits within APU nacelle 14 (shown in FIG. 1). Accordingly, additional examples of suitable maximum aspect ratios for the cross section of attenuation region 36 include ratios of about 20-to-1, with particularly suitable maximum aspect ratios including ratios of about 17-to-1, and with even more particularly suitable maximum aspect ratios including ratios of about 15-to-1.

In one embodiment, the convergence and divergence of the walls of air inlet assembly 20 allow the varying cross sections along air inlet assembly 20 to have substantially the same cross sectional areas. In this embodiment, while the aspect ratios of the cross sections (in planes perpendicular to the airflow) vary over the length of air inlet assembly 20, the areas of the cross sections remain substantially the same. For example, the cross sections of entrance region 34 at intake opening 16 (shown in FIG. 2) and of exit region 38 at intake plenum 42 (shown in FIG. 2) each have low aspect ratios relative to the cross section of attenuation region 36. However, in this embodiment, these cross sections have substantially the same areas. This preserves the volumetric flow rate of air through air inlet assembly 20, thereby preventing a bottleneck effect within air inlet assembly 20. Examples of suitable variations in cross sectional areas for attenuation region 36 relative to entrance region 34 and exit region 38 include variations of about 10% or less (i.e., the cross sectional area of attenuation region 36 is at least about 90% of the cross sectional areas of entrance region 34 and exit region 38, with particularly suitable area variations including variations of about 5% or less, and with even more particularly suitable area variations including variations of about 1% or less.

The convergence and divergence of the walls of air inlet assembly 20 also desirably allows air inlet assembly 20 to be installed within aircraft without substantial modifications to the dimensions of the intake opening (e.g., intake opening 16) and the intake plenum (e.g., intake plenum 42) of the aircraft. As such, air inlet assembly 20 may be designed around standard APU nacelle dimensions. For example, offset width 58 of attenuation region 36 may be set to attenuate a desired noise frequency from an APU turbine engine (e.g., APU 18). The aspect ratio of the cross section of attenuation region 36 may then be set to match a desired volumetric flow rate through attenuation region 36. The convergence and divergence of the walls of entrance region 34 and exit region 38 may then be set for installation with the dimensions of the aircraft intake opening and intake plenum. This further increases the versatility of air inlet assembly 20 for use with a variety of different turbine engine designs.

While the components of air inlet assembly 20 are discussed herein as having directional orientations (e.g., front, rear, top, bottom, height, width, lateral, and vertical), such orientations are used for ease of discussion, and are not intended to be limiting to any particular spatial orientation within an aircraft. Although the present invention has been described with reference to preferred embodiments, workers skilled in the art will recognize that changes may be made in form and detail without departing from the spirit and scope of the invention.

The invention claimed is:

1. An air inlet assembly configured for placement in an auxiliary power unit (APU) nacelle in an aircraft, comprising:
   an entrance region configured to receive an airflow from an intake opening of the aircraft;
   an exit region configured to output the airflow to the APU
   an attenuation region disposed between the entrance region and the exit region, the attenuation region being free of segregating splitters and having a cross section aspect ratio of at least 5-to-1, wherein the attenuation region comprises acoustic absorbing material; and
   one or more support pins extending between opposite side walls of the attenuation region that provide reinforcing support for the attenuation region.

2. The air inlet assembly of claim 1, wherein the acoustic absorbing material comprises an acoustic liner.

3. The air inlet assembly of claim 1, wherein the cross section aspect ratio is at least 7-to-1.

4. The air inlet assembly of claim 3, wherein the cross section aspect ratio is at least 10-to-1.

5. The air inlet assembly of claim 1, wherein the cross section aspect ratio is 20-to-1 or less.

6. The air inlet assembly of claim 1, wherein the entrance region has a cross section aspect ratio adjacent the intake opening that is less than the aspect ratio of the attenuation region.

7. The air inlet assembly of claim 1, wherein the exit region has a cross section aspect ratio adjacent a turbine engine that is less than the aspect ratio of the attenuation region.

8. The air inlet assembly of claim 1, wherein the attenuation region further comprises a pair of exterior walls having interior surfaces offset by a distance ranging from 15 millimeters to 150 millimeters.

9. An air inlet assembly for use with an intake opening and a turbine engine of an aircraft, the air inlet assembly comprising:
- a first pair of opposing walls that converge from the intake opening to a middle region, and that diverge from the middle region toward the turbine engine;
- a second pair of opposing walls that diverge from the intake opening to the middle region, and that converge from the middle region toward the turbine engine;
- wherein the middle region is free of segregating splitters and has a cross section aspect ratio of at least 5 to 1
- wherein at least one of the walls of the first and second pairs of opposing walls includes acoustic absorbing material at a portion of the middle region; and
- one or more support pins extending between opposite side walls of the middle region that provide reinforcing support for the middle region.

10. The air inlet assembly of claim 9, wherein the acoustic absorbing material comprises an acoustic liner.

11. The air inlet assembly of claim 9, wherein the first pair of opposing walls have interior surfaces that are offset at the middle region by a distance ranging from 15 millimeters to 150 millimeters.

12. The air inlet assembly of claim 11, wherein the distance ranges from 20 millimeters to 100 millimeters.

13. The air inlet assembly of claim 12, wherein the distance ranges from 25 millimeters to 50 millimeters.

14. An air inlet assembly for use with an intake opening and a turbine engine of an aircraft, the air inlet assembly comprising:
- an entrance region having a first end configured to be secured adjacent to the intake opening and a second end, the first end of the entrance region having a first cross section;
- an exit region having a first end configured to be secured adjacent to the turbine engine and a second end, the first end of the exit region having a second cross section;
- an attenuation region disposed between the second end of the entrance region and the second end of the exit region, the attenuation region being free of segregating splitters and having a third cross section, wherein the aspect ratio of the third cross section is at least 7-to-1 and is greater than aspect ratios of the first cross section and of the second cross section; and
- acoustic absorbing material within the attenuation region, wherein the acoustic absorbing material is positioned in a portion of the attenuation region with the largest cross section aspect ratio; and
- one or more support pins wherein the shape and configuration of the support pins are designed to minimize surface area and provide reinforcing support for the attenuation region.

15. The air inlet assembly of claim 14, wherein the acoustic absorbing material comprises an acoustic liner.

16. The air inlet assembly of claim 14, wherein the first cross section has a first cross sectional area, the second cross section has a second cross sectional area, and the third cross section has a third cross sectional area, and wherein a variation between the first and second cross sectional areas and the third cross sectional area is 10% or less.

17. The air inlet assembly of claim 16, wherein variation between the first and second cross sectional areas and the third cross sectional area is 5% or less.

18. The air inlet assembly of claim 14, wherein the aspect ratio of the third cross section is at least 10-to-1 and no more than 20-to-1.

19. The air inlet assembly of claim 14, wherein the attenuation region has a substantially constant cross section aspect ratio.

20. The air inlet assembly of claim 14, and further comprising:
- a first wall of the attenuation region having a planar portion, wherein the acoustic absorbing material is secured to the planar portion of the first wall.

21. The air inlet assembly of claim 1, and further comprising:
- a first wall of the attenuation region having a first planar portion, wherein the acoustic absorbing material is secured to the first planar portion; and
- a second wall of the attenuation region having a second planar portion that is substantially parallel to the first planar portion.

* * * * *